United States Patent [19]

Asrar et al.

[11] Patent Number: 5,703,134
[45] Date of Patent: Dec. 30, 1997

[54] COPOLYMERS OF RECYCLED POLYESTER

[75] Inventors: Jawed Asrar; A. Hameed Bhombal, both of Chesterfield, Mo.

[73] Assignee: Monsanto Company, St. Louis, Mo.

[21] Appl. No.: 762,722

[22] Filed: Dec. 10, 1996

Related U.S. Application Data

[63] Continuation of Ser. No. 427,639, Apr. 21, 1995, abandoned, which is a continuation of Ser. No. 209,809, Mar. 11, 1994, abandoned.

[51] Int. Cl.$^6$ .................. C08J 11/04; C08L 67/02
[52] U.S. Cl. .................. 521/48; 521/48.5; 528/304; 528/305; 528/308.2; 528/308.3
[58] Field of Search .............. 521/48, 48.5; 528/304, 528/305, 308.2, 308.3

[56] References Cited

U.S. PATENT DOCUMENTS

| | | | |
|---|---|---|---|
| Re. 30,783 | 10/1981 | Kleiner et al. | 528/287 |
| 3,257,335 | 6/1966 | Whitfield, Jr. et al. | 521/48.5 |
| 3,453,240 | 7/1969 | Plaster et al. | 521/48.5 |
| 3,641,112 | 2/1972 | Ichikawa et al. | 260/475 P |
| 3,703,488 | 11/1972 | Morton | 521/48 |
| 3,884,850 | 5/1975 | Ostrowski | 521/48.5 |
| 3,922,323 | 11/1975 | Reese et al. | 260/927 R |
| 3,941,752 | 3/1976 | Kleiner et al. | 260/75 |
| 3,969,437 | 7/1976 | Shim | 260/937 |
| 4,014,858 | 3/1977 | Chipman et al. | 260/75 R |
| 4,034,141 | 7/1977 | Duffy et al. | 428/473 |
| 4,064,079 | 12/1977 | Sidebotham et al. | 521/48 |
| 4,096,202 | 6/1978 | Farnham et al. | 260/873 |
| 4,204,070 | 5/1980 | Suzuki et al. | 560/94 |
| 4,365,054 | 12/1982 | Stabley, Jr. | 528/277 |
| 4,440,924 | 4/1984 | Kuze et al. | 528/275 |
| 4,501,878 | 2/1985 | Adams | 528/286 |
| 4,656,241 | 4/1987 | Iida et al. | 528/279 |
| 4,745,211 | 5/1988 | Jackson et al. | 560/80 |
| 4,959,450 | 9/1990 | Morris et al. | 528/272 |
| 4,970,286 | 11/1990 | Genz et al. | 528/193 |
| 4,983,707 | 1/1991 | Tanisake et al. | 528/193 |
| 4,983,777 | 1/1991 | Van Sickle | 568/568 |
| 4,985,501 | 1/1991 | Udipi | 525/173 |
| 5,003,041 | 3/1991 | Morris et al. | 525/444 |
| 5,011,877 | 4/1991 | Morris et al. | 524/115 |
| 5,011,878 | 4/1991 | Morris et al. | 524/115 |
| 5,116,938 | 5/1992 | Engel-Bader et al. | 528/272 |
| 5,376,735 | 12/1994 | Sublett | 528/308.6 |
| 5,408,035 | 4/1995 | Duh | 528/480 |

FOREIGN PATENT DOCUMENTS

| | | | |
|---|---|---|---|
| 0510591A2 | of 1992 | European Pat. Off. | C08L 67/02 |
| 55-718 | of 1980 | Japan | C08G 63/18 |
| 9302122 | of 1993 | WIPO | C08G 63/189 |

Primary Examiner—Vasu S. Jagannathan
Assistant Examiner—Olga Asinovsky
Attorney, Agent, or Firm—Fitzpatrick Cella Harper & Scinto

[57] ABSTRACT

New copolymers of recycled polyesters having improved properties are disclosed. The copolyesters are produced by a reaction of recycled polyalkylene terephthalate and a dicarboxylate moiety.

4 Claims, No Drawings

COPOLYMERS OF RECYCLED POLYESTER

This application is a continuation of U.S. Pat. application No. 08/427,639, filed Apr. 21, 1995, which in turn is a continuation of U.S. Pat. application No. 08/209,809, filed Mar. 11, 1994, the contents of which are hereby incorporated by reference both are abandoned.

BACKGROUND OF THE INVENTION

This invention relates to new copolyesters produced from recycled polyesters and to a method for producing the polyesters. More particularly, this invention relates to new copolyesters produced from recycled polyethylene terephthatate and to a method for producing the copolyesters. More particularly, this invention relates to copolyesters of recycled polyethylene terephthalate having properties better than the properties of virgin polyethylene terephthalate and to a method for making the polyesters.

DESCRIPTION OF THE PRIOR ART

One of the major uses of polyethylene terephthalate is the production of bottles for milk and soft drinks and several billion bottles are produced for these uses each year. In recent years the environment has received greater attention and organized efforts have appeared to promote the recycling of many materials including the bottles made of polyethylene terephthalate to remove them from the growing volume of solid waste. Polyethylene terephthalate can be depolymerized to the monomers, ethylene glycol and dimethyl terephthalate, or processed into lower grade polyester products. However, the properties of recycled polyethylene terephthalate such as, for example, the glass transition temperature and other physical properties have generally been inferior when compared to the properties of virgin polyethylene terephthalate because the intrinsic viscosity is lower. Recycled polyethylene terephthalate has, thus, generally not been used for the production of products such as bottles where these properties are relatively critical. Instead the recycled polyethylene terephthalate, like other recycled plastic, has been used to produce products with less demanding requirements such as, for example, fibers for pillows, building materials such as plastic lumber and dividers for parking lots.

A need remains for polymers made from recycled polyethylene terephthalate which have properties equal to, or better than, the properties of virgin polyethylene terephthalate and for a process to produce such a recycled copolyester.

SUMMARY OF THE INVENTION

It is an object of this invention to provide copolyesters of recycled polyesters having properties better than the properties of the virgin polyesters.

It is another object of this invention to provide copolyesters of recycled polyethylene terephthalate having a higher intrinsic viscosity and glass transition temperature than virgin polyethylene terephthalate.

It is a further object of this invention to provide a method for producing copolyesters of recycled polyesters such as polyethylene terephthalate.

These and other objects are met by this invention which is directed to copolyesters of recycled polyethylene terephthalate having an intrinsic viscosity greater than about 0.6, and preferably within the range of from about 0.6 to about 1.2, and a glass transition temperature greater than about 75° C. The copolyester of recycled polyethylene terephthalate is preferably a polyethylene dicarboxylate copolyester having from about 99.9% to about 15% by weight recycled polyethylene terephthalate and from about 0.1% to about 85% by weight of another dicarboxylate moiety. The other dicarboxylate moiety can be produced from any dicarboxylic acid except terephthalic acid. If, for example, a polyester having a high glass transition temperature or other good high temperature properties is desired, then the dicarboxylate moiety is preferably produced from an aromatic bis-hydroxy alkyl dicarboxylate such as, for example, bis-β-hydroxy ethyl bibenzoate. The copolyester is produced by placing the desired amounts of recycled polyethylene terephthalate and the dicarboxylate in a nitrogen filled reactor in the presence of a catalyst which is preferably based upon antimony such as, for example, antimony oxide. The reactor is heated to a temperature within a range of from about 273° C. to about 293° C. for about 3 hours. A vacuum is applied slowly to reduce the pressure to a pressure of from about 0.5 to about 1.0 mm of mercury.

In addition to copolyesters of recycled polyethylene terephthalate and polybutylene terephthalate, the invention also includes copolyesters of polyethylene naphthanate and other polyalkylene dicarboxylates.

DESCRIPTION OF THE PREFERRED EMBODIMENTS

The present invention relates to copolyesters of recycled polyethylene terephthalate having properties better than the properties of virgin polyethylene terephthalate and specifically having a higher intrinsic viscosity and higher glass transition temperature than virgin polyethylene terephthalate. Thus the copolyesters of this invention have an intrinsic viscosity greater than about 0.6, and preferably within the range of from about 0.6 to about 1.2. The copolyesters of recycled polyethylene terephthalate are preferably a polyethylene dicarboxylate copolyester having from about 99.9% to about 15% by weight recycled polyethylene terephthalate and from about 0.1% to about 85% by weight of another dicarboxlyate moiety.

While recycled polyethylene terephthalate is the preferred polyester, other polyalkylene terephthalate polyesters such as, for example, recycled polybutylene terephthalate can be used.

The other dicarboxylate moiety can be produced from any dicarboxylic acid except terephthalic acid. Thus the dicarboxylate moiety can be produced from substituted or unsubstituted isophthalic acid, from the substituted or unsubstituted dicarboxylic acids of biphenyls, naphthalene, terphenyls and other polyaromatics such as, for example, diphenyl ether, and from substituted terephthalic acid. When a dicarboxylic acid other than unsubstituted terephthalic acid is reacted with recycled polyethylene terephthalate, the copolyesters of this invention are produced. If, for example, a polyester having a high glass transition temperature or other good high temperature properties is desired, then the dicarboxylate moiety is preferably produced from an aromatic bis-hydroxy alkyl dicarboxylate. The dicarboxylate moiety is preferably produced from a hydroxy ethyl dicarboxylate compound or other hydroxy alkyl dicarboxylate having the general formula:

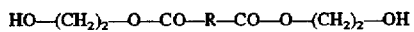

where R is selected from the group consisting of substituted benzene wherein the substituent is a halogen, an alkyl group having a carbon chain of from 1 to about 8 carbon atoms, phenyl or a substituted phenyl group; naphthyl; substituted naphthyl wherein the substituent is hydrogen, halogen, an alkyl group having a carbon chain of from 1 to about 8 carbon atoms, phenyl or a substituted phenyl group; and a moiety having the general formula:

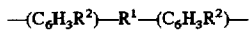

wherein $R^1$ is selected from the group consisting of nil (zero or a direct bond), oxygen, phenyl, substituted phenyl, an alkyl group having a carbon chain of from 1 to about 8 carbon atoms and —HC=CH— and wherein each $R^2$ is independently selected from the group consisting of hydrogen, halogen, an alkyl group having a carbon chain of from 1 to about 8 carbon atoms, phenyl and substituted phenyl. More specifically the dicarboxylate moiety is preferably produced from bis-β-hydroxy ethyl bibenzoate.

While the dicarboxylate moiety is preferably a hydroxy ethyl dicarboxylate compound, it is recognized that other hydroxy alkyl groups may be used and it is preferred that each of the alkyl groups be independently selected from the group consisting of alkyl radicals having from 1 to 8 carbon atoms such as, for example, methyl, propyl, isopropyl, butyl, hexyl, 2-ethylbutyl, octyl and 2-ethylhexyl groups.

The preferred dicarboxylate monomer is bis-β-hydroxy ethyl bibenzoate; however, the biphenyl moiety is not required. As shown above, the copolyesters of this invention may be produced equally well from a naphthanate or another dicarboxylate such as, for example, bis-hydroxy ethyl naphthanate, bis-hydroxy ethyl isophthalate, and bis-hydroxy ethyl diphenyl ether. Although these examples are of dicarboxylates having bis-hydroxy ethyl groups, other hydroxy alkyls such as, for example, bis-hydroxy butyl, bis-hydroxy hexyl and bis-hydroxy octyl groups can be used.

The dicarboxylate moieties used in the process have structures which will strengthen the polymer and impart rigidity to the polymer backbone. As a result the copolyester will have a higher glass transition temperature and the tensile and flexural properties of the polyester will be improved. In addition the resulting copolyester of recycled polyethylene terephthalate and the dicarboxylic moiety has an increased molecular weight, both weight average molecular weight (Mw) and number average molecular weight (Mn), when compared to the molecular weight of recycled polyethylene terephthalate which is recycled without the inclusion of the dicarboxylate moiety of this invention. When polyethylene naphthanate or other dicarboxylates are used to produce copolyesters in accordance with this invention, the resulting copolyesters have improved performance characteristics such as, for example, increased intrinsic viscosity and higher glass transition temperature. The improvement in the characteristics of copolyesters produced from naphthanates or other dicarboxylates is similar to the improvement in the characteristics of polyethylene terephthalate when it is recycled in accordance with this invention.

The lower molecular weight of the polyester produced from recycled polyethylene terephthalate without the inclusion of the dicarboxylate moiety is believed to be caused by chain scission, the breaking of carbon-carbon bonds, during the recycling process. The inclusion of the dicarboxylate moiety in the process of this invention promotes chain bonding to produce longer carbon chains and, thus, higher molecular weights. The inclusion of the dicarboxylic moiety is a complex process in which the intrinsic viscosity of the process fluid drops originally from the viscosity of the recycled polyethylene terephthalate to as low as about 0.25 before it begins to rise and the intrinsic viscosity of the copolyester may reach as high as about 1.2 if the process is allowed to go to completion.

The copolyesters of recycled polyethylene terephthalate are preferably polyethylene dicarboxylate copolyesters having from about 99.9% to about 5% by weight recycled polyethylene terephthalate and from about 0.1% to about 95% by weight of another dicarboxylate moiety. The properties desired in the copolyester products will determine the amount of the other dicarboxylate moiety included in the copolyester.

Copolyesters of polyethylene terephthalate having from about 0.1% to about 20% of hydroxy ethyl bibenzoate have a low melting point (Tm), low crystallinity and a low rate of crystallization. However these copolyesters have a higher glass transition temperature and better stability against ultraviolet light than polyethylene terephthalate. These polyesters would be particularly suited for use in the production of biaxially oriented films or other similar products.

Copolyesters of polyethylene terephthalate having from about 20% to about 45% of hydroxy ethyl bibenzoate are amorphous polyesters that do not have a melting point. These polyesters would be particularly suited for use as a substitute for high temperature, amorphous polyethylene terephthalate.

Copolyesters of polyethylene terephthalate having greater than about 45%, and preferably from about 45% to about 95%, of hydroxy ethyl bibenzoate have a high melting point (Tm) and higher crystallinity when compared to polyethylene terephthalate prepared at the same conditions. These polyesters would be particularly suited for use as high performance engineering plastics.

Copolyesters of polyethylene terephthalate and a dicarboxylate moiety other than hydroxy ethyl bibenzoate exhibit similar phase behavior when the amount of the other dicarboxylate moiety in the copolyester is varied. Copolyesters of polybutylene terephthalate and another dicarboxylate moiety also exhibit similar phase behavior.

A large portion of the production of polyethylene terephthalate is based upon the melt polymerization of terephthalic acid and ethylene glycol. The melt polymerization process produces polyethylene terephthalate having an inherent viscosity of about 0.6 and it is necessary to use solid state polymerization in addition to the melt polymerization to raise the inherent viscosity of the polyethylene terephthalate to the range of from about 0.9 to about 1.2 that is needed for the production of many products.

The addition of a few percent of another dicarboxylate moiety in the form of, for example, bis-β-hydroxy ethyl bibenzoate to the recycled polyethylene terephthalate raises the glass transition temperature of the polyethylene terephthalate copolyester. In addition, it significantly improves the polymerization process to produce copolymers of polyethylene terephthalate having an inherent viscosity greater than about 0.6 and preferably within the range of from about 0.6 to about 1.2 without the previously required, and expensive, solid state polymerization steps. It is possible to produce copolymers of recycled polyethylene terephthalate and another dicarboxylate wherein the copolyesters have from about 99.9% to about 5% by weight recycled polyethylene terephthalate and from about 0.1% to about 95% by weight of another dicarboxylate moiety.

The properties of the copolyesters of recycled polyethylene terephthalate are dependent upon the amount of the other dicarboxylate moiety included in the copolyester. For example, copolyesters having from about 99.9% to about 80% by weight recycled polyethylene terephthalate and from about 0.1% to about 20% by weight of hydroxy ethyl bibenzoate have a low melting point, low crystallinity and a higher glass transition temperature. Copolyesters having from about 80% to about 55% by weight recycled polyethylene terephthalate and from about 20% to about 45% by weight of hydroxy ethyl bibenzoate are amorphous. Copolyesters having from about 55% to about 5% by weight recycled polyethylene terephthalate and from about 45% to about 95% by weight of hydroxy ethyl bibenzoate have a high melting point, high crystallinity and a higher glass transition temperature. Copolyesters of polyethylene terephthalate and a dicarboxylate other than hydroxy ethyl bibenzoate exhibit similar phase behavior as the amount of the other dicarboxylate moiety in the copolyester is varied.

The copolyesters were produced by placing the desired amounts of recycled polyethylene terephthalate and bis-β-hydroxy ethyl bibenzoate in a nitrogen filled reactor in the presence of a catalyst which is preferably antimony oxide. The reactor was heated to a temperature within a range of from about 273° C. to about 293° C. for about 3 hours. A vacuum was applied slowly to reduce the pressure to a pressure of from about 0.5 to about 1.0 mm of mercury. The copolyester prepared from the recycled polyethylene terephthalate and bis-β-hydroxy ethyl bibenzoate was essentially the same as copolyesters produced from the monomers, that is from terephthalic acid, ethylene glycol and biphenyl dicarboxylic acid.

The copolyesters and processes have been described above using recycled polyethylene terephthalate and the preferred hydroxy ethyl dicarboxylate moiety. However, the copolyesters can also be produced by using ethylene glycol and the appropriate diacid in the process with the recycled polyethylene terephthalate. Thus ethylene glycol and biphenyl dicarboxylic acid may be used in the process to replace bis-β-hydroxy ethyl bibenzoate. Similarly, ethylene glycol and naphthalene dicarboxylic acid may be used.

This invention will be explained in detail in accordance with the examples below, which are for illustrative purposes only and shall not limit the present invention. The ratio of the reactants and properties of the resulting copolymers are shown in the Table below.

EXAMPLE 1-11

After the label was removed, a polyethylene terephthalate bottle, such as those which contain soft drinks, was washed with detergent and water, cut into pieces and dried at a temperature of about 60° C. for 7 hours in a vacuum oven. A mixture of 18 grams of recycled bottle polyethylene terephthalate, 2 grams of bis-β-hydroxy ethyl bibenzoate and 0.004 grams of antimony oxide was placed within a 50 milliliter flask with a stainless steel stirrer. The flask had a nitrogen inlet and outlet and a provision for pulling a vacuum. The flask was evacuated and filled with nitrogen 3 times at room temperature and then a continuous, slow flow of nitrogen was maintained through the flask. The flask was placed in a salt bath which had been preheated to about 250° C. The temperature of the salt bath was raised from 250° C. to about 285° C. over a period of 1 hour and ethylene glycol was distilled off. The pressure was then reduced to 150 millitorr over a period of about 1 hour. The pressure in the flask was further reduced to about 50 millitorr over a period of about 30 minutes and the reaction was continued at these conditions for an additional 45 minutes at which time the heat and vacuum were removed. The resulting copolymer had an intrinsic viscosity of 1.28 at a concentration of 0.5 grams/deciliter in a solution of 60% phenol/40% tetrachloroethane at 25° C. The glass transition temperature was determined to be 85° C. by differential scanning calorimeter. This example is shown as Example 4 in the Table below.

The reaction of the Example was repeated eleven times and the ratio between the reactants, the ratio of the recycled polyethylene terephthalate to the bis-β-hydroxy ethyl bibenzoate, was varied in accordance with this invention. The ratio of the polyethylene terephthalate to the bibenzoate was varied from a reaction with only polyethylene terephthalate, as a reference or control, to a reaction with 3.5 grams of polyethylene terephthalate and 16.5 grams of bis-β-hydroxy ethyl bibenzoate. Examples 1–11 are shown in the Table below.

EXAMPLE 12

The reaction of Examples 1–11 was modified to illustrate another embodiment of the invention. The bis-β-hydroxy ethyl bibenzoate was replaced by biphenyl dicarboxylic acid and ethylene glycol. In this reaction, 18 grams of recycled polyethylene terephthalate (PET), 2 grams of 4,4'-biphenyl dicarboxylic acid (BDA) and 1.025 grams of ethylene glycol (EG) were reacted in the presence of 0.004 grams of antimony oxide. The conditions of the reaction were as set forth in Examples 1–11 above. Example 12 is shown in the Table below.

The following Table shows the results of the reactions described in the Examples above. The Table includes the ratio of the reactants, the amount of the catalyst (antimony oxide) present in the reactor during the reaction and properties of the resulting copolymers. For Examples 1–11, the Table includes the ratio of the grams of recycled polyethylene (PET) to the grams of hydroxy ethyl bibenzoate (HEB) used in the reaction. For Example 12, the Table includes the ratio of the grams of recycled polyethylene terephthalate (PET), the grams of 4,4'-biphenyl dicarboxylic acid (BDA) and the grams of ethylene glycol (EG). The properties included in the Table are the intrinsic viscosity (I.V.), the molecular weight as weight average molecular weight (Mw) and number average molecular weight (Mn), and the glass transition temperature in degrees Centigrade (Tg).

TABLE

| EXAMPLE | RATIO PET/HEB | GRAMS OF CATALYST | I.V | Mw/Mn | Tg (°C.) |
|---|---|---|---|---|---|
| 1(Control) | 20/0 | — | 0.7 | 46.7/11.8 | 82 |
| 2(Control) | 20/0 | — | 0.609 | 38/16.0 | — |
| 3 | 19/1 | 0.048 | 0.981 | 57.7/21.7 | 85 |
| 4 | 18/2 | 0.004 | 1.28 | — | 85 |
| 5 | 18/2 | 0.0013 | 0.726 | 56.2/24.1 | 85, 83 |
| 6 | 18/2 | 0.017 | 0.935 | 78.5/24.9 | 85 |
| 7 | 15/5 | 0.016 | 0.673 | 51.3/20.0 | 87 |
| 8 | 10/10 | 0.048 | 0.816 | 81.5/28.3 | 96 |
| 9 | 8/12 | 0.0014 | 0.655 | 51.3/19.1 | — |
| 10 | 8/12 | 0.0077 | 0.792 | | — |
| 11 | 3.5/16.5 | 0.007 | 0.987 | | — |
| 12 | ET/BDA/EG (18/2/1.025) | 0.004 | 0.80 | | 85 |

EXAMPLE 13

The reaction of Examples 1–11 was modified to illustrate another embodiment of the invention. In this reaction, 18 grams of recycled polyethylene terephthalate (PET) and 2 grams of hydroxy ethyl naphthanate (HEN) were reacted in the presence of 0.004 grams of antimony oxide. The conditions of the reaction were as set forth in Examples 1–11 above. The resulting copolymer had an inherent viscosity of 1.167 at a concentration of 0.5 grams/deciliter in a solution of 60% phenol/40% tetrachloroethane at 25° C. The glass transition temperature was determined to be 83° C. by differential scanning calorimeter.

While certain preferred embodiments of the invention have been illustrated and described herein, it is to be understood that the invention is not limited thereby and that the invention may be variously practiced within the scope of the following claims.

We claim:

1. A process for producing a copolyester of recycled polyethylene terephthalate and a dicarboxylate moiety comprising:
   a) heating unmodified recycled polyethylene terephthalate and a dicarboxylate moiety in a reactor to a temperature within the range of from about 273° C. to about 293° C. for a period of from about 1 hour to about 3 hours; and
   b) reducing the pressure to a pressure of from about 0.5 to about 1.0 mm mercury.

2. The process of claim 1 wherein the dicarboxylate moiety is a bibenzoate moiety.

3. The process of claim 2 wherein the bibenzoate moiety is bis-β-hydroxy ethyl bibenzoate.

4. The process of claim 3 wherein the copolyester is from about 99.9% to about 5% by weight unmodified recycled polyethylene terephthalate and from about 0.1% to about 95% by weight bis-β-hydroxy ethyl bibenzoate.

* * * * *

UNITED STATES PATENT AND TRADEMARK OFFICE
CERTIFICATE OF CORRECTION

PATENT NO. : 5,703,134

DATED : December 30, 1997

INVENTOR(S) : JAWED ASRAR ET AL.

It is certified that error appears in the above-identified patent and that said Letters Patent is hereby corrected as shown below:

On the title page, item:

[54] TITLE

"POLYESTER" should read --POLYESTERS--.

COLUMN 1

Line 1, "POLYESTER" should read --POLYESTERS--.

Signed and Sealed this

Third Day of November, 1998

Attest:

BRUCE LEHMAN

Attesting Officer

Commissioner of Patents and Trademarks